(12) United States Patent
Cawte et al.

(10) Patent No.: US 11,391,609 B2
(45) Date of Patent: Jul. 19, 2022

(54) FLOW METER

(71) Applicant: Sentronics Limited, Salisbury (GB)

(72) Inventors: Andrew Cawte, Salisbury (GB); Jamie Nathaniel Jones, Salisbury (GB)

(73) Assignee: Sentronics Limited, Salisbury Wiltshire (GB)

( * ) Notice: Subject to any disclaimer, the term of this patent is extended or adjusted under 35 U.S.C. 154(b) by 869 days.

(21) Appl. No.: 16/096,004

(22) PCT Filed: Apr. 24, 2017

(86) PCT No.: PCT/GB2017/051134
§ 371 (c)(1),
(2) Date: Oct. 24, 2018

(87) PCT Pub. No.: WO2017/187146
PCT Pub. Date: Nov. 2, 2017

(65) Prior Publication Data
US 2019/0128715 A1 May 2, 2019

(30) Foreign Application Priority Data

Apr. 25, 2016 (GB) .................................... 1607144

(51) Int. Cl.
*G01F 1/00* (2022.01)
*G01F 1/667* (2022.01)
(Continued)

(52) U.S. Cl.
CPC ................ *G01F 1/667* (2013.01); *G01F 1/66* (2013.01); *G01F 1/662* (2013.01); *G01F 25/10* (2022.01);
(Continued)

(58) Field of Classification Search
CPC . G01F 1/66; G01F 1/667; G01F 1/662; G01F 25/0007; G01N 29/024; G01N 2291/02836; G01P 5/245
See application file for complete search history.

(56) References Cited

U.S. PATENT DOCUMENTS 3,935,735 A * 2/1976 Lee ......................... G01F 1/667
73/861.29
4,787,252 A 11/1988 Jacobson et al.
(Continued)

FOREIGN PATENT DOCUMENTS

| EP | 2824429 A1 | 1/2015 |
|---|---|---|
| GB | 2237639 A | 5/1991 |
| GB | 2259571 A | 3/1993 |

OTHER PUBLICATIONS

International Search Report and Written Opinion for PCT/GB2017/051134 dated Aug. 31, 2017 (11 pages).
(Continued)

*Primary Examiner* — Douglas X Rodriguez
*Assistant Examiner* — Sangkyung Lee
(74) *Attorney, Agent, or Firm* — Bejin Bieneman PLC

(57) ABSTRACT

A method of measuring a flow rate of a fluid flowing along a path, the method comprising: transmitting successive pairs of periodic signals through the fluid, the respective signals of each pair being transmitted in opposite directions along, and from opposite ends of, the path; determining a difference in propagation times of each signal of each pair along the path; and determining a flow rate of fluid along the path based on the difference in propagation times of the signals of each pair along the path; wherein a phase of each signal is altered with respect to a phase of at least one other signal transmitted along the path.

18 Claims, 4 Drawing Sheets

(51) Int. Cl.
  *G01F 1/66* (2022.01)
  *G01F 25/10* (2022.01)
  *G01N 29/024* (2006.01)
  *G01P 5/24* (2006.01)

(52) U.S. Cl.
  CPC .......... *G01N 29/024* (2013.01); *G01P 5/245* (2013.01); *G01N 2291/02836* (2013.01)

(56) References Cited

U.S. PATENT DOCUMENTS

| | | | |
|---|---|---|---|
| 5,493,916 A | 2/1996 | Bignell | |
| 6,062,091 A | 5/2000 | Baumoel | |
| 8,700,344 B2 * | 4/2014 | Wilson | G01F 1/668 |
| | | | 702/48 |
| 2004/0267464 A1 | 12/2004 | Umekage et al. | |
| 2010/0095782 A1 | 4/2010 | Ferencz et al. | |
| 2012/0271568 A1 | 10/2012 | Wilson et al. | |

OTHER PUBLICATIONS

Combined Search and Examination Report under Sections 17 and 18(3) for Application No. GB1607144.1 dated Aug. 31, 2016 (7 pages).

* cited by examiner

FLOW METER

CROSS-REFERENCE TO RELATED APPLICATIONS

This application is a national stage of, and claims priority to, Patent Cooperation Treaty Application No. PCT/GB2017/051134, filed on Apr. 24, 2017, which claims priority to Great Britain Application No. GB1607144.1, filed on Apr. 25, 2016, both of which are hereby incorporated herein by reference in their entireties.

FIELD OF THE DISCLOSURE

The present disclosure relates to a method of measuring a flow rate of a fluid and to an associated flow meter. In particular, but not exclusively, the disclosure relates to a method and an associated flow meter for measuring fuel flow rate in a vehicle.

BACKGROUND TO THE DISCLOSURE

Ultrasonic flow meters are in widespread use in a range of applications for the measurement of fluid flow rates. Known flow meters of this type operate on the principle that the propagation time of ultrasonic signals travelling through a fluid between two fixed points varies depending on whether the signal travels in the direction of flow or against the direction of flow, with signals propagating more quickly when travelling with the flow. Accordingly, the velocity of the fluid can be determined based on a difference in propagation times of ultrasonic signals travelling with and against the flow.

In a typical configuration, two transducers are positioned opposite one another at respective ends of a cylindrical fluid channel of known dimensions, so that fluid flowing through the fluid channel flows between the transducers. Each transducer acts in turn as both emitter and receiver. An ultrasonic signal, namely a short, periodic pressure wave at 18 kHz or above, is emitted by one of the transducers to travel in the direction of fluid flow, while the other transducer acts as receiver. On detecting the signal at the receiving transducer, the time-of-flight of the first signal is determined. Then, the roles of the transducers are reversed and a second ultrasonic signal is transmitted in the opposite direction to the first to travel against the direction of fluid flow, and its time-of-flight is determined. The difference in time-of-flight of the two signals is then compared and the velocity of the fluid through the channel can be derived using the known length of the channel. The fluid velocity can be converted into a volumetric flow rate with reference to the known cross-sectional area of the channel.

Noting that the comparison between times-of-flight assumes a constant flow rate to derive the velocity based on a difference in propagation times, a delay between signals reduces the reliability of each measurement since the flow rate may alter between successive signals. Hence, the accuracy of the measurements provided by such a flow meter diminishes as the delay between signals increases.

Another problem with known ultrasonic flow meters is a high intrinsic margin of error in the output measurements, due to the fact that the difference in times-of-flight of the signals is extremely small relative to the magnitudes of the times-of-flight themselves. This means that measurement error in the times-of-flight may be on a similar order of magnitude to the difference in those times, leading to high uncertainly in the final measurement values.

For this reason, flow meters are known in which ultrasonic signals are emitted from each transducer simultaneously, and then both transducers are switched to receiving mode to detect the signal emitted by the opposite transducer. This approach eliminates the possibility of the flow rate changing between signals, and also allows the difference in time-of-flight to be measured directly, therefore minimising measurement error.

Ultrasonic flow meters of this kind are inherently reliable and are capable of providing accurate readings in harsh environments, as there are no moving parts. They are therefore favoured for demanding applications such as measurement of fuel flow rate in motorsport.

However, such flow meters may be subjected to noise originating from various sources that can interfere with the signals to affect the shape and timing of the received signal, which can in turn distort the time-of-flight measurements. These sources of noise include internal sources from within the flow meter itself, such as echoes from earlier signals or unwanted continued vibration of the transducers after emitting a signal, and external sources.

Echoes from previous signals oscillate within the fluid channel to an extent determined by the acoustic properties of the channel. These echoes can interfere with subsequent signals, and can cause unwanted apparent detections by the receiving transducer. If a second signal is emitted before the echoes of a first signal have decayed, it may not be possible to distinguish the second signal from the echoes at the receiving transducer.

To address interference from echoes, known flow meters allow a delay between signals that is sufficient to allow echoes within the fluid channel to decay naturally, thereby avoiding false detections. The length of the delay required is dictated by the characteristics of each flow meter and its transducers. The skilled reader will appreciate that introducing such a delay restricts the rate at which flow rate measurements can be taken.

Regarding unwanted continued vibration of the transducers, it is noted that transducers are electro-mechanical devices that inherently continue to vibrate mechanically after an electrical excitation signal has been removed, until the energy imparted to the transducer by that signal has dissipated. Therefore, once the excitation is removed, the vibrations settle naturally over a short period after emitting an ultrasonic signal. This is known as 'ringing-on'. A similar effect may arise after detecting a signal, to a lesser extent.

Since detection of a signal involves sensing vibrations induced in the transducer by that signal by converting those vibrations into an electronic signal, ringing-on can interfere with detection, in that the continued vibration of the transducer creates an electronic signal that superimposes onto any further electronic signal generated when a signal impacts the transducer. This can cause a steady-state error in the output measurement values.

Ringing-on therefore limits the minimum time between transmitting a signal from a transducer and then receiving another signal at that same transducer. It is noted that ringing-on typically decays far more quickly than echoes, and in flow meters using sequential signals there is usually sufficient time for each transducer to settle after transmitting a signal before it has to receive a signal from the opposing transducer. Ringing-on is therefore primarily a problem in flow meters that utilise ultrasonic signals that are almost or exactly simultaneous, due to the very short time required for a signal to traverse the length of the flow channel, which is dictated by the length of the channel and the speed of sound through the fluid in the channel. In most implementations, there is insufficient time for each transducer to settle before the signal emitted by the opposing transducer arrives.

There are various ways in which known flow meters attempt to mitigate the effects of ringing-on. For example, less resonant transducers having greater mechanical damping by virtue of their construction may be selected. This minimises the duration of ringing-on after each transmission, but has the drawback that the damping causes a loss of signal power, which raises the signal-to-noise ratio.

As an alternative, as the ringing-on effect of a transducer is usually predictable, flow rate measurements can be calibrated to account for it provided the speed of sound in the fluid is known beforehand. However, this indirect method of counteracting ringing-on relies on an estimation of the effect of the ringing-on, and so introduces uncertainty into the final measurements.

It is also noted that the impact of ringing-on may be relatively small, and so may be accepted as a compromise in applications in which highly accurate measurements are not required.

Aside from internal noise, depending on the application there may be various external sources of noise. For example, in an automotive vehicle environment where a flow meter is used for measuring a fuel flow rate, a fluid circuit generally includes various components having cyclic operation, such as fuel pumps, valves or fuel injectors. As a result, the flow of fuel through the fluid circuit and through the flow meter is not entirely steady, even though the average flow rate may be constant. Instead, the fuel flow fluctuates with a frequency corresponding to the frequency of operation of each of the cyclic components. If the frequency of fluctuation of fuel flow coincides with or is a multiple of the sampling frequency of the flow meter, i.e. the rate at which ultrasonic signals are released, a steady-state error will arise that will cause the flow meter to indicate that the flow rate is higher or lower than it truly is. For example, if each measurement sample coincides with a moment at which the fluctuating fuel flow slows, the output reading will be too low. This effect is known as 'aliasing'.

It is possible to manipulate the aliasing effect by deliberately introducing external noise to cause a flow meter to report a flow rate that is lower than the true flow rate; it is known to do this in motorsport, for example, where there are strict restrictions on fuel consumption and where a competitive advantage can therefore be gained by influencing a flow meter in this way. Alongside a general aim to provide accurate data, a desire to ensure compliance with motorsport regulations therefore provides an incentive to prevent aliasing from external noise sources.

It is against this background that the present disclosure has been devised.

SUMMARY OF THE DISCLOSURE

An aspect of the disclosure provides a method of measuring a flow rate of a fluid flowing along a path. The method comprises transmitting successive pairs of periodic signals through the fluid, the respective signals of each pair being transmitted in opposite directions along, and from opposite ends of, the path. The method further comprises determining a difference in propagation times of each signal of each pair along the path, and determining a flow rate of fluid along the path based on the difference in propagation times of the signals of each pair along the path. A phase of each signal is altered with respect to a phase of at least one other signal transmitted along the path.

By controlling the phase of each signal with respect to the phases of other signals, it is possible to counteract the effects of noise arising from echoes of previous signals or ringing-on of transducers, by ensuring that the effect of noise in the determined flow rate tends to average towards zero over a series of measurements.

It is noted that the 'path' referred to above is a common path defining a route that each transmitted signal takes through the fluid from one end of the path to an opposite end. The path is not necessarily straight, and so transmitting signals in opposite directions along the path does not necessarily entail transmitting them directly at each other. Accordingly, this term is intended to cover arrangements in which signals are transmitted so that they follow a common path, but travel in opposite directions along that path such that they propagate in opposite directions through fluid.

It is also noted that the path may not be aligned with the direction of travel of the fluid. For example, signals could be transmitted along a path that crosses the fluid flow diagonally at an acute angle. However, the path is arranged at least partly within a fluid flow so that the fluid flow always has a non-zero component in a direction aligned to the path, so that fluid flows along the path to at least some extent. In other words, the opposed ends of the path are spaced in the direction in which the fluid flows.

The method may comprise detecting arrival of each signal at a location from which the other signal was transmitted.

The at least one other signal may comprise the other signal of the respective pair, which may have been transmitted from an opposite end of the path. This allows the effect of ringing-on of transducers to be compensated for through altering the phase of the signal. Alternatively, or in addition, the at least one other signal may comprise a signal previously transmitted along the path, which allows for noise generated by echoes of previous signals to be counteracted.

Altering the phase of each signal may comprise changing a time interval between each signal and a respective preceding signal transmitted from the same end of the path with respect to a time interval between the preceding signal and a signal that preceded the preceding signal. In such embodiments, the time interval may be varied by an amount that is no greater than the period of each signal, where the period of a signal is the duration of a single cycle, namely one complete wave, of the signal. Restricting the time interval in this way can achieve effective echo cancellation. However, similar results may also be obtained using larger time intervals. For example, time intervals that are multiples of a period of each signal may be used.

Alternatively, or in addition, altering the phase of each signal may comprise changing an initial angle of each signal relative to an initial angle of a respective preceding signal transmitted from the same position in the path. It is noted that the 'angle' of a signal refers to its position with respect to its full cycle, where a signal is at zero (i.e. zero pressure for an ultrasonic pulse or 0V for an electronic excitation signal) at 0°, 180° (half-wave) and 360° (full cycle). For a steady ultrasonic waveform the angle is therefore also indicative of the instantaneous pressure of the signal.

Altering the phase of each signal may, in a further option, comprise changing an initial angle of each signal relative to an initial angle of the other signal of the respective pair, in which case the method may comprise transmitting at least two successive signals from each end of the path with substantially equal angles.

In some embodiments, changing the initial angle of a signal comprises inverting the signal with respect to the at least one other signal. This beneficially provides a practical implementation that takes into account the mechanical limitations of the transducers used to generate the signal.

Altering the phase of each signal may also comprise changing a delay between transmitting a first signal of the pair and transmitting a second signal of the pair. The delay may be configured so that the signals are transmitted near-simultaneously, so that they cross each other on the path before reaching the opposite ends of the path from which they were transmitted. Alternatively, the method may comprise transmitting the pair of periodic signals simultaneously.

Each signal may be a pressure wave such as an ultrasonic signal having a frequency of at least 18 KHz.

The method may comprise transmitting a sequence of pairs of signals, and altering the respective phases of each signal of the sequence so that an average phase of the signals of the sequence is substantially equal to a mid-point of a range over which the phases of the signals of the sequence are varied. In such embodiments, the phases of the signals of the sequence may be altered so that they are evenly distributed throughout the range over which the phases of the signals of the sequence are varied. This approach beneficially ensures that the net effect on the flow measurement error arising from the sequence of signals tends towards zero over time, in turn minimising the impact of earlier signals of the sequence on measurement of later signals of the sequence.

The disclosure also extends to a flow meter, or a controller for a flow meter, configured to perform any of the methods described above.

Another aspect of the disclosure provides a controller for a flow meter. The controller is configured to generate activation signals that cause first and second transmitters of the flow meter to transmit successive pairs of periodic measurement signals to respective first and second receivers in opposite directions along, and from opposite ends of, a path along which fluid flows. Each activation signal is arranged such that a phase of the resulting measurement signal is altered with respect to a phase of at least one other measurement signal transmitted along the path. The controller is further configured to receive detection signals from the first and second receivers, each detection signal being indicative of arrival of a measurement signal at the respective receiver, and to process the detection signals to determine a difference in propagation times of each measurement signal along the path. The controller is further configured to determine a flow rate of fluid along the path based on the difference in propagation times of the measurement signals along the path.

A further aspect of the disclosure provides a flow meter, comprising: a measurement channel through which fluid flows along a path; a first transmitter and a second transmitter that are spaced from each other within the measurement channel so as to transmit successive pairs of periodic signals through the fluid in opposite directions along, and from opposite ends of, the path; a first receiver positioned within the measurement channel to receive periodic signals transmitted by the first transmitter; a second receiver positioned within the measurement channel to receive periodic signals transmitted by the second transmitter; and a controller according to the above aspect arranged to control the first and second transmitters to transmit respective measurement signals to their respective receivers through fluid flowing along the path, and to receive and process detection signals from the first and second receivers.

The flow meter may comprise a first transducer that comprises the first transmitter and the second receiver, and a second transducer that comprises the second transmitter and the first receiver.

As for the method of the disclosure defined earlier, in the flow meters referred to above the fluid does not necessarily flow in a direction that is perfectly aligned to the path along which the transmitted signals propagate.

It will be appreciated that preferred and/or optional features of each aspect of the disclosure may be incorporated alone or in appropriate combination in the other aspects of the disclosure also.

BRIEF DESCRIPTION OF THE DRAWINGS

In order that the disclosure may be more readily understood, preferred non-limiting embodiments thereof will now be described, by way of example only, with reference to the accompanying drawings, in which.

DETAILED DESCRIPTION OF EMBODIMENTS OF THE DISCLOSURE

The present disclosure relates to a new type of flow meter for measuring a flow rate of a fluid such as automotive fuel. An example of an ultrasonic flow meter according to an embodiment of the disclosure is shown in cross-section in FIG. 1. It is noted that the flow meter of the disclosure is structurally similar to known flow meters, and so the below description of the physical components of the flow meter shown in FIG. 1 is included primarily to provide context for the disclosure, which is described in more detail later.

Figure 1:
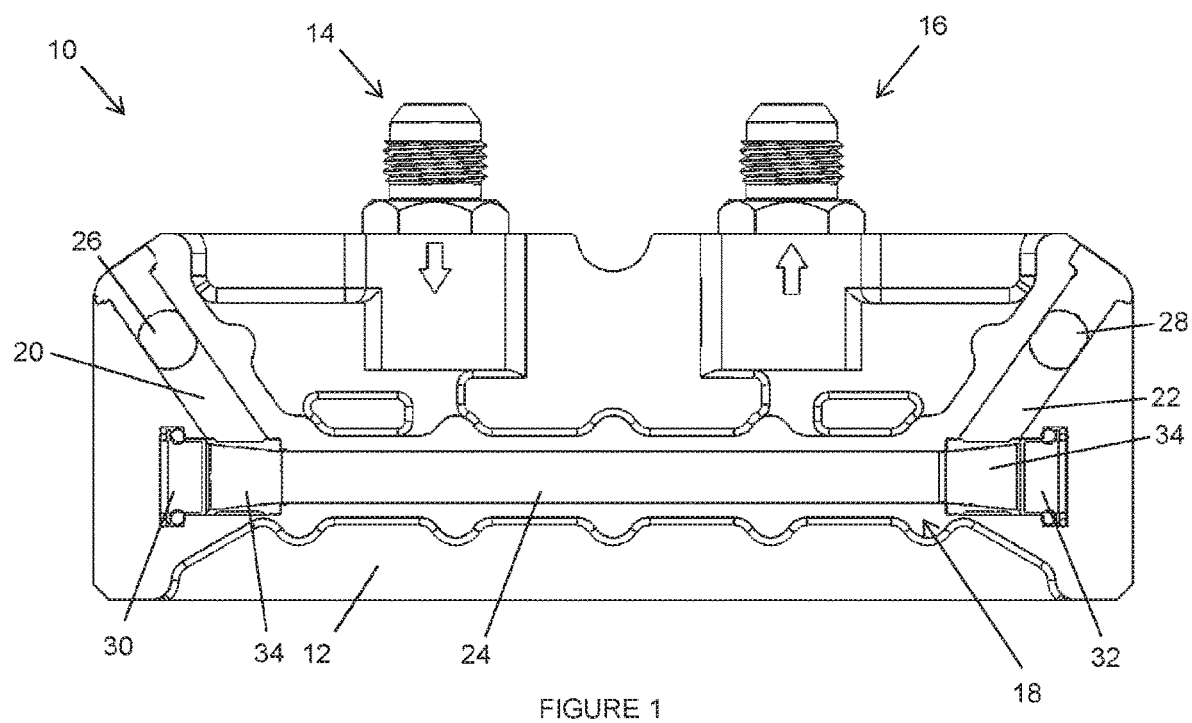
FIG. 1 is a cross-sectional view of a flow meter that is suitable for operation according to embodiments of the disclosure.

The flow meter 10 shown in FIG. 1 comprises a main housing 12 having an inlet port 14 for admitting fluid and an outlet port 16 for expelling fluid. A flow channel 18 is defined within the housing 12 to provide fluid communication between the inlet port 14 and the outlet port 16. In use, fluid enters the inlet port 14, flows through the flow channel 18 and exits through the outlet port 16. The flow meter 10 can therefore be readily integrated into a fluid circuit of, for example, an automotive vehicle.

The flow channel 18 is formed from a series of cylindrical passages within the housing 12, three of which are visible in FIG. 1: an inlet passage 20, an outlet passage 22 and a central passage 24. The inlet and outlet passages 20, 22 are disposed at opposite ends of the main housing 12 and terminate at the inlet port 14 and the outlet port 16 respectively. The inlet and outlet passages 20, 22 are inclined downwardly from their respective ports toward one another to merge with the central passage 24, which extends generally horizontally through the housing 12 to provide communication between the inlet and outlet passages 20, 22.

Other passages that are not visible in FIG. 1 are defined within the housing 12 to link the inlet port 14 to the inlet passage 20, and the outlet port 16 to the outlet passage 22. One such passage lies orthogonal to and intersects the inlet passage 20 to define an inlet opening 26 located in an upper portion of the inlet passage 20. Fluid flowing into the inlet port 14 and in turn into the passages immediately connected to the inlet port 14 reaches the inlet passage 20 through the inlet opening 26. Correspondingly, fluid exits the outlet passage 22 through an outlet opening 28 that connects to a passage that leads to the outlet port 16.

In practice, the inlet passage 20, the outlet passage 22 and the central passage 24 may be manufactured as drillings having one or more open ends. The open ends of the inlet and outlet passages 20, 22 and of the central passage 24 may be closed by bungs, closure assemblies or by any other suitable means. Therefore, for simplicity these features are omitted from FIG. 1.

Opposed first and second ultrasonic transducers 30, 32 are disposed at respective ends of the central passage 24 to provide a means for measuring the flow rate of fluid travelling through the central passage 24, between the transducers 30, 32. The central passage 24 therefore defines a measurement channel 24 for fluid flow, and is hereafter referred to as such.

The first transducer 30 is positioned at an end of the measurement channel 24 at its junction with the inlet channel, and the second transducer 32 is located at the opposite end of the measurement channel 24, at a junction between the measurement channel 24 and the outlet passage 22.

Each transducer 30, 32 is configured to operate in turn in both a transmitter mode and a receiver mode. Thus, the first and second transducers 30, 32 may alternatively be referred to as transceivers. In other embodiments, separate transmitters and receivers may be used.

The first and second transducers 30, 32 may be any suitable components that are capable of converting an AC electrical input signal into an ultrasonic signal, and vice-versa, including capacitive transducers or piezoelectric transducers.

Respective diffusers 34 in the form of hollow cylinders with punctured surfaces having one or more apertures are positioned at the junction between the inlet passage 20 and the central passage 24, and at the junction between the outlet passage 22 and the central passage 24. Fluid flowing through the flow channel 18 passes through the apertures of the diffusers 34, which helps to reduce turbulence in the measurement channel 24 and therefore improve the accuracy of flow rate measurements.

Figure 2:
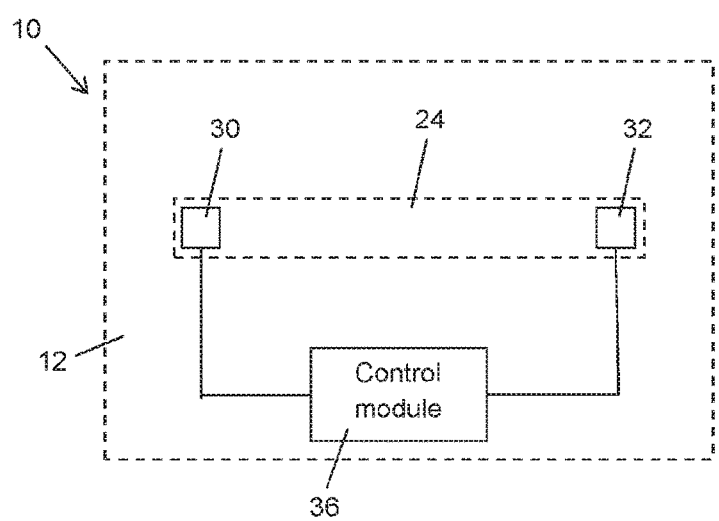
FIG. 2 is a schematic drawing showing an architecture of the flow meter of FIG. 1.

With reference now to FIG. 2, which shows schematically an architecture of the flow meter 10, operation of the first and second transducers 30, 32 is controlled by a control module 36 that is integral to the flow meter 10 and is electrically connected to the first and second transducers 30, 32. The control module 36 operates to switch the transducers 30, 32 between the transmitter and receiver modes, determine and control the characteristics of ultrasonic signals emitted by the transducers 30, 32 by issuing appropriate electrical activation signals, and process returning electrical signals from the transducers 30, 32 associated with detection of ultrasonic signals, to derive values for flow rates of fluid within the measurement channel 24.

In alternative embodiments, an external controller can be used, in which case the flow meter 10 includes terminals that enable communication between the controller and the first and second transducers 30, 32.

When in the transmitter mode, each transducer 30, 32 transmits a respective ultrasonic signal into the measurement channel 24 to propagate along a common path toward the opposite transducer 30, 32, so that the ultrasonic signals travel through any fluid flowing through the measurement channel 24. It is noted that in the embodiment shown in FIG. 1, the path along which the transmitted signals propagate is aligned with a direction of flow of fluid through the measurement channel 24.

Each ultrasonic signal comprises a periodic pressure wave defining a pulse or pulse train having a frequency in the ultrasonic range, namely 18 KHz or above.

It is noted that it is possible for signals of lower frequency to be used, for example signals in the audible range. This entails larger transducers and in turn a measurement channel 24 of greater diameter, and so may be practical in large industrial flow meters involving high flow rates, for example.

It is emphasised at this stage that the flow meter 10 shown in FIG. 1 and described above is only provided as representative of the type of flow meter 10 to which embodiments of the disclosure may be applied, and the skilled person will be familiar with many variations that would be equally suitable for use with the disclosure.

For example, the transducers 30, 32 may not be positioned at the ends of the measurement channel 24, and may not send signals that travel parallel to the direction of flow of fluid through the measurement channel 24. Instead, the transducers 30, 32 may be positioned at any point within the measurement channel 24 to transmit signals that travel along paths that are inclined relative to the flow direction.

Furthermore, the path may not be entirely straight, and may include one or more changes of direction. For example, signals may be directed at a series of reflective elements within the measurement channel 24, so that the signals bounce along the measurement channel before reaching the opposing transducer 30, 32.

Moreover, the transducers 30, 32 may not be oriented to face one another to send signals directly to each other, and may instead direct signals to one another along an indirect path using reflective surfaces within the measurement channel 24.

As already noted, an ultrasonic signal travelling in the direction of fluid flow takes less time to reach the opposite transducer 30, 32 than a signal travelling against the flow. Since the first transducer 30 is positioned adjacent to the inlet passage 20, signals transmitted from the first transducer 30 travel in the direction of fluid flow, noting that fluid flows from the inlet passage 20 to the outlet passage 22. Conversely, as the second transducer 32 sends signals in the opposite direction, its signals travel against the direction of fluid flow. The signals transmitted from the first transducer 30 will therefore propagate through the measurement channel 24 more quickly than signals transmitted by the second transducer 32. It is noted that the flow meter 10 shown in FIG. 1 is inherently bi-directional and so is capable of operating in reverse, such that fluid flows from the outlet port 16 to the inlet port 14.

In some embodiments, as with some of the known flow meters referred to above, respective signals are emitted from the first and second transducers 30, 32 simultaneously. As signals produced by the first transducer 30 propagate more quickly than those produced by the second transducer 32, each time a pair of signals is released, the second transducer 32 receives a signal before the first transducer 30.

Using simultaneous signals has the benefit that, for a given sample rate, echoes in the measurement channel 24 are allowed twice as long to decay compared with a sequential signal arrangement. This is because the echoes from each transducer 30, 32 decay over the same period, rather than one after the other. This inherently reduces the effect of noise from the echoes.

A further benefit of using simultaneous signals is that the difference in the respective times-of-flight can be measured directly as the time interval between receiving a signal at the second transducer 32 and then receiving a signal at the first transducer 30. The measurement of this delay can then be converted into an indication of the flow rate of fluid within the measurement channel 24. This approach avoids having to measure the time-of-flight of each individual signal, thereby minimising measurement error and so providing a more accurate measurement of the flow rate than is possible in flow meters employing sequential signals.

In other embodiments, the transmission times of the signals may be varied so that they are not transmitted exactly simultaneously, as shall be described later with reference to FIG. 7. For example, near-simultaneous signals may be used, which means that the signals are not transmitted at exactly the same time, but cross each other in the measurement channel 24 before reaching their respective opposing transducers 30, 32. Using near-simultaneous signals can achieve some of the same benefits as simultaneous signals.

As already noted, flow meters employing ultrasonic signals are susceptible to inaccurate readings due to interference from internal noise as a result of echoes of previous signals and, in particular where simultaneous signals are used, ringing-on of the transducers 30, 32. In addition, external noise sources can cause aliasing, namely a constant or low frequency error in the output measurement provided by the flow meter 10.

To address all of these types of interference, embodiments of the disclosure alter one or more characteristics of each ultrasonic signal with respect to corresponding characteristics of other ultrasonic signals to prevent constructive interference between signals, and instead ensure that any interference reduces towards zero mean noise when the signals interact.

Moreover, by controlling the characteristics of each signal appropriately, the signals can also be used to cancel ringing-on interference from the transducers 30, 32 themselves.

By using the techniques described below, much higher sampling frequencies can be used than in prior art approaches. For example, in embodiments of the disclosure sampling frequencies of 2 KHz or more are used. The flow rate measurements are low-pass filtered to remove high frequency noise, to produce highly accurate measurement values.

Typically, ultrasonic transducers are configured to produce signals at a certain frequency, and offer little flexibility of control in this respect. Similarly, although it is often possible to control the amplitude of the generated signals, it is rarely practical to do so. Therefore, in practice the main characteristic of the signals that can be varied relates to their timing and initial angle, which collectively define a phase of the signal, as shall become clear in the description that follows.

In general terms, altering the timing of successive signals emitted by an individual transducer may involve varying the magnitude of time intervals between successive signals, changing the initial angle of each signal, or a combination of the two. The specific reasons for using either of these techniques shall be expanded upon below.

Figure 3:
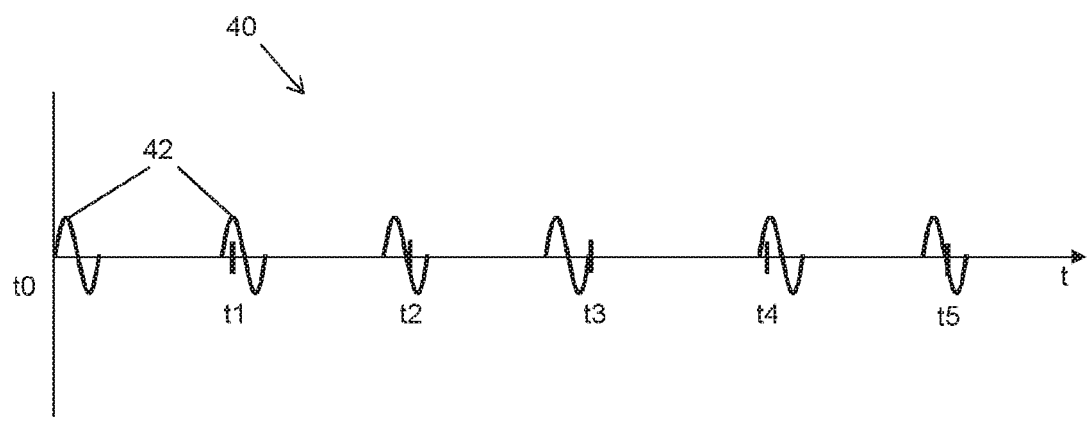
FIG. 3 is a graph showing a method according to a first embodiment of the disclosure for phase modulation of signals transmitted in the flow meter of FIG. 1.

These techniques can both be considered phase modulation of a signal, in that changing an initial angle of a signal produces a similar effect to altering the interval between consecutive signals having similar starting angles, insofar as each approach modifies a time interval between points of consecutive signals having the same angle. Correspondingly, both approaches produce a series of signals in which the angle of each signal varies with reference to a fixed regular time interval, for example a long-term average sample rate. This principle is illustrated in FIG. 3, which is described in more detail later.

Variation of signal timing characteristics, whether by varying the intervals between successive signals or by altering the starting angles of either successive or opposed signals, shall hereafter be referred to generically as phase modification of the signals. Moreover, a series of signals whose angles are dissimilar over regular time intervals shall be referred to as being out-of-phase with one another.

While the relative phases of two signals normally refers to the angle of those signals at their respective origins, by inverting the above reasoning, varying a time interval between signals can be considered equivalent to changing the initial angles of successive signals. So, referring to signals that are controlled in this way as phase-shifted is consistent with conventional understanding of this term.

Although conceptually the initial angle of a signal may lie anywhere between 0° and 360°, in practice a physical transducer starts at 0° when at rest, and cannot be moved instantaneously to another arbitrary angle. The only parameter over which control may be exerted is the direction in which the transducer is excited initially. Similarly, an electrical input to the transducer is typically at 0V at rest, and cannot move to another excitation voltage instantaneously. So, in practical implementations altering the initial angle of the ultrasonic signals typical entails inverting the signal with respect to other signals. Therefore, the ultrasonic signals used in embodiments of the disclosure will typically have an initial angle of either 0° or 180°.

It is noted, however, that the excitation voltage can be set at any initial level within the parameters of the control components. So, if an alternative initial angle is desired for the transducers 30, 32, an appropriate excitation signal can be used, in which case the transducer 30, 32 will initially lag behind the excitation signal and then will catch up to follow the excitation signal, typically within a few periods of the signal.

Moving on now to FIG. 3, the technique of varying time intervals between a series of signals transmitted from an individual transducer 30, 32 is illustrated. FIG. 3 shows a sequence 40 of six individual ultrasonic signals 42, each represented as a simple periodic waveform having one complete cycle. In practice, the ultrasonic signals 42 produced by the transducers 30, 32 may include several cycles, which provides an opportunity to refine the overall measurement accuracy by measuring time intervals between corresponding points of individual cycles of the signal, thereby enabling random noise to be filtered out when processing the data obtained from the transducers 30, 32. The points of individual cycles may be their peaks, troughs, points at which the signal 42 is zero, or any other points on the signal cycles.

The signals 42 shown in FIG. 3 are generally sinusoidal, but in other embodiments the periodic signals 42 may take any form. For example, the signals may be in the form of square waves or sawtooth waves.

The graph of FIG. 3 includes time markers denoted t0 to t5, which represent fixed regular time intervals corresponding to a long-term average sample rate of the signals 42. The time markers therefore represent the times at which each signal 42 would commence if regular time intervals were used between the signals 42.

In this embodiment, each signal 42 is transmitted at or near to one of the time markers, but does not always commence at the time marker. Instead, the position of the individual signals 42 in relation to their respective time markers is variable, with some signals 42 commencing at their respective marker, others finishing at their respective marker, and the rest falling somewhere in between. Hence, the time intervals between the start of each signal 42 is non-uniform, and so the sample rate is variable over short periods.

As each signal 42 has a unique position in relation to its respective time marker, it follows that the angle of each signal 42 at its respective time marker is different. The signals 42 are therefore out-of-phase with one another in the sense defined above.

In this embodiment, the signals 42 are controlled such that the average sample rate is steady over longer periods by restricting the variance in the time interval between successive signals 42 to a range of zero to one full period of an ultrasonic signal. In other words, the signals 42 are varied by plus or minus 180° with respect to a nominal start time. This means that each signal 42 coincides with a respective time marker, albeit at different points of the signal.

It is noted that the time intervals between signals 42 may be significantly larger relative to the period of the signals 42 than suggested by FIG. 3. As already noted, using methods of the disclosure average sample rates of 2 KHz or more can be used. This is much higher than in known flow meters, in which interference from echoes of previous signals dictates a much lower sample rate. A high sample rate is advantageous for applications such as motorsport in particular, where high resolution data is desirable. By taking measurements at such high frequency, the averaged output measurement value can be based on a greater number of individual measurements than in a flow meter that samples at a lower frequency, thereby improving the accuracy of the measurement value.

By varying the time intervals between signals 42 so that the signals 42 are out-of-phase with respect to the average sample rate, the signals 42 are de-correlated from each other and so their echoes do not interfere constructively. Instead, after several signals 42 have been transmitted the echoes sum to zero. This means that the echoes manifest in measured detection data obtained from the first and second transducers 30, 32 operating in receiver mode as random noise, which is removed when the measurement data is low-pass filtered. This technique of ensuring that the effect of echoes adds to zero mean noise only, and does not generate a systematic error, to the measured flow is referred to as 'echo cancellation'. In contrast, in prior art approaches where signals are in-phase, the echoes interfere constructively and so create a constant error in the detection data if the sampling frequency is too high.

In this way, varying the time intervals between successive signals 42 so that the signals 42 are out-of-phase counteracts the tendency of noise from echoes of preceding signals to result in a steady-state error in the flow measurement, thereby enabling the flow meter 10 to operate at a higher sampling rate than is possible in approaches where echoes must be allowed to decay naturally before transmitting another signal 42.

The variation in the time intervals between signals 42 can be entirely random, or it can be controlled according to a defined repeating sequence.

Varying the time intervals between signals 42 also acts as an anti-aliasing measure, in that changing the interval each time ensures that signals 42 are out-of-phase with any regular fluctuation of fluid flow through the flow meter 10 caused by cyclic components such as fuel pumps. This means that successive fluid flow measurements are taken at different stages of the fluctuation of fluid flow, thereby avoiding a steady-state error and providing an accurate reflection of the mean velocity of fuel through the flow meter 10.

To optimise the anti-aliasing effect, the magnitude of variation of the time intervals between signals 42 should be comparable with the period of fluctuation of the fluid flow rate. This ensures measurements are taken at every stage of fluctuation, and so the fluctuation will be effectively cancelled when the averaged flow rate is calculated over a series of measurements.

In selecting an appropriate range of values for the time intervals to take, the sample frequency is a determining factor, noting that the effect of echoes becomes more significant as sample frequency increases, whereas aliasing is more prevalent at lower sampling frequencies. The manner in which time intervals are varied can therefore be controlled according to the specific requirements of each application.

The anti-aliasing and echo cancelling effects can be enhanced by controlling the variation of the time intervals between signals 42 so that the noise created in the measurement data as a result of fluid flow fluctuation is in the higher end of the frequency spectrum. As the measurement data is low-pass filtered, shaping the noise in this way ensures that it is removed more effectively by the low-pass filter and thus is present to a lesser extent in the final measurement values.

To achieve this, the variation in time intervals needs to be at a high frequency, which can be provided by passing a random sequence of time intervals through a high-pass filter before applying it to the measurement signals 42.

Figure 4:
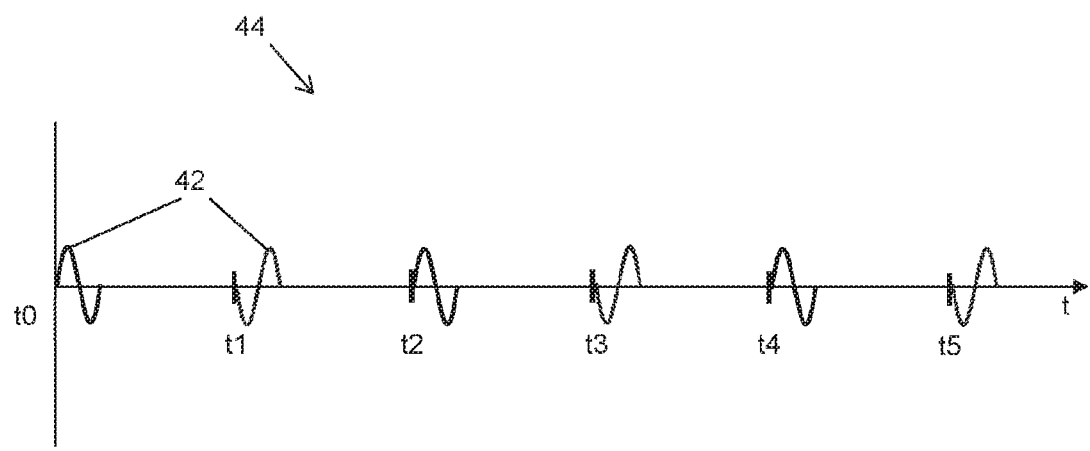
FIG. 4 is a graph showing a method according to a second embodiment of the disclosure for phase modulation of signals transmitted in the flow meter of FIG. 1.

FIG. 4 shows another sequence 44 of signals 42 transmitted by an individual transducer 30, 32, and illustrates the alternative, complementary way in which the measurement signals 42 can be varied, namely to alter their initial angles by inverting them. FIG. 4 shows a sequence 44 of six signals 42 spaced at regular intervals, which are denoted as t0 to t5 as in FIG. 3. The signals 42 alternate between starting angles of 0° and 180°, noting that 0° corresponds to a positive-bound signal 42, whereas 180° corresponds to a negative-bound signal 42.

Due to the inverting nature of the signals 42, successive signals 42 have different angles over a fixed time interval. For example, as already noted, the starting angles are at fixed intervals and alternate between 0° and 180°. If the fixed intervals were to start from a nominal point just after t0, the first signal 42 would have an angle between 0° and 90°, whereas the next signal 42 would have an angle between 180° and 270°.

This illustrates how inverting the signals 42 produces a series that is out-of-phase, thereby providing an equivalent effect to varying the intervals between the signals 42. As the signals 42 are out-of-phase, the series shown in FIG. 4 provides the same echo cancellation and anti-aliasing benefits as the series of FIG. 3 described above, and so offers an alternative approach for achieving these benefits.

Another way to understand the way in which the technique shown in FIG. 4 provides echo cancellation is to note that the alternating nature of the signals 42 means that erroneous detections of echoes will alternate in the same way, and so will average to zero. This is also applicable to the time variance technique of FIG. 3, to the extent that changing the time intervals is equivalent to altering the starting angles of the individual signals 42.

Figure 5:
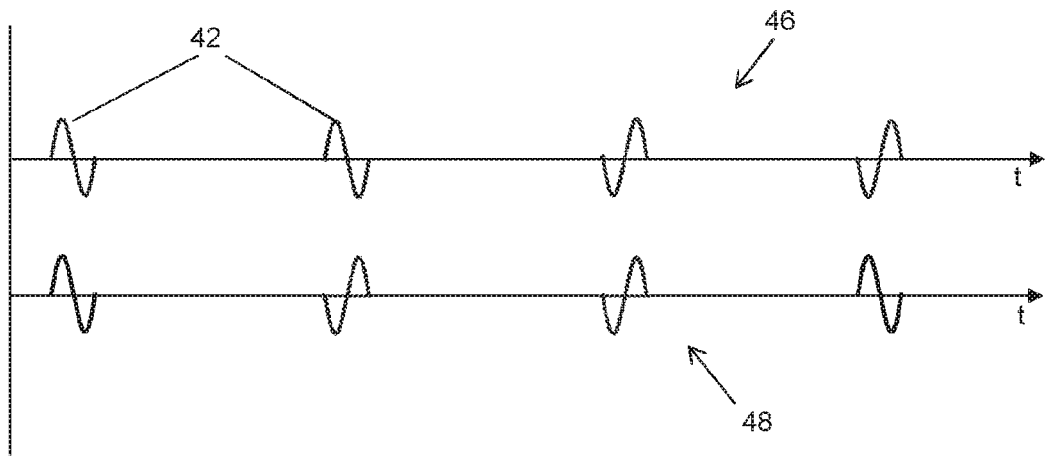
FIG. 5 is a graph showing a method according to a third embodiment of the disclosure for phase modulation of signals transmitted in the flow meter of FIG. 1.

FIG. 5 shows two parallel sequences 46, 48 of measurement signals 42: an upper sequence 46, which is transmitted from the first transducer 30; and a lower sequence 48 that is transmitted from the second transducer 32. It should be noted that although the sequences 46, 48 are shown in parallel, the signals 42 of the upper sequence 46 travel in the opposite direction to those of the lower sequence 48 within the measurement channel 24.

These sequences 46, 48 are optimised for suppressing interference arising from ringing-on of the transducers 30, 32. As the measurement channel 24 of the flow meter 10 is relatively short, there is little time for the energy imparted to each transducer 30, 32 to dissipate before the transducer 30, 32 must detect a signal 42 from the opposing transducer 30, 32, and so dealing with ringing-on is beneficial at any sampling frequency.

The phase of the ringing-on interference at each transducer 30, 32 depends on the phase of the signal 42 produced by the transducer 30, 32 most recently. If the interference is in phase with the signal 42 that it is to detect, constructive interference will ensue. Conversely, ringing-on that is out-of-phase with the detected signal 42 will cause destructive interference. In each case, a steady-state error arises that skews the final measurement value.

However, in the sequences 46, 48 shown in FIG. 5, the phase of one of the transducers 30, 32 changes with each pair of measurement signals 42. It is noted that a different transducer 30, 32 swaps phase each time, which brings balance to the system and counteracts any accumulation of ringing-on in an individual transducer 30, 32. Using the notation 'P' for a positive-bound signal 42, and 'N' for a negative bound signal 42, the sequence of signal pairs shown in FIG. 5 is: PP, PN, NN, NP. This pattern can repeat for as long as required.

Accordingly, the ringing-on of each transducer 30, 32 is alternately in phase and out-of-phase with the signal 42 that it detects, and so the relative phase of the ringing-on with respect to the detected signal 42 alternates. This means that the interference switches between being constructive and destructive, and therefore the effect of the interference is cancelled out over the sequence.

Taking the first two pairs of signals 42 as an example, the first pair of signals 42 are both phase P, and so the ringing-on at each transducer 30, 32 will be phase P also. Therefore, the ringing-on of each transducer 30, 32 will be in phase with the signal 42 that it detects, causing constructive interference. The next pair of signals 42 has a phase P signal 42 transmitted from the first transducer 30, and a phase N signal 42 transmitted from the second transducer 32. Therefore, the first transducer 30 will have phase P ringing-on but will receive a phase N signal 42, and the second transducer 32 will have phase N ringing-on and will receive a phase P signal 42. Therefore, in this second step the ringing-on of each transducer 30, 32 is out-of-phase with the signal 42 that it detects, causing destructive interference. This cancels the constructive interference caused by ringing-on after the first pair of signals 42 were transmitted, thereby removing any measurement error caused by ringing-on.

This demonstrates that the effect of ringing-on can be counteracted by transmitting pairs of signals 42 that are alternately in phase and then out-of-phase. Indeed, there is no need for the phases to follow a strict alternation pattern: ringing-on interference can be cancelled using any sequence in which there are an equal number of signal pairs of the same phase as there are signal pairs of opposite phases, although the cancellation effect may diminish where the change in relative phase is not sufficiently distributed through the sequence. The skilled reader will appreciate that there are therefore many other possible sequences that could be used to achieve ringing-on cancellation other than the example shown in FIG. 5.

Moreover, although simple inversion of the signals 42 has been found to be sufficient to cancel ringing-on interference, and indeed is all that is typically possible in practical implementations, if the capabilities of the transducers 30, 32 permit any other change in the initial angle of the signals 42 may be used to provide the required change in phase for cancelling the ringing-on interference.

The sequences 46, 48 shown in FIG. 5 will not be effective in removing noise from echoes as each sequence 46, 48 has successive signals 42 of the same phase. However, other sequences can be used in which at least one pair of signals 42 is identical to the pair that preceded it, so that only the echoes that persist from previous measurements change at that stage of the sequence. This allows the effect of the echoes to be determined and discarded from the final measurement values.

One example of a sequence that allows this is the following 16 step sequence: NN, PP, NN, NN, PN, PN, NP, PN, NP, PN, NP, NP, PP, PP, NN, PP. It is noted that, as in the sequence of FIG. 5, there are an equal number of pairs in which the signals 42 from opposing transducers 30, 32 are in phase and out-of-phase with respect to each other, which achieves the required ringing-on cancellation.

In a further refinement, the discrete measurement values obtained from each signal pair in the sequences 46, 48 can be compared with the averaged measurement value to obtain an error term providing an indication of the relative error for each signal pair of the sequences 46, 48. These error terms can then be subtracted from the raw measurements when the sequence is repeated to reduce high frequency noise in the final measurement value.

As an alternative, or in addition to the above technique, it is also possible to combine the timing variance technique shown in FIG. 3 for echo noise removal and the phase switching technique of FIG. 5 for cancelling ringing-on interference, to remove the effect of noise from both echoes and ringing-on from the final measurement values.

Figure 6:
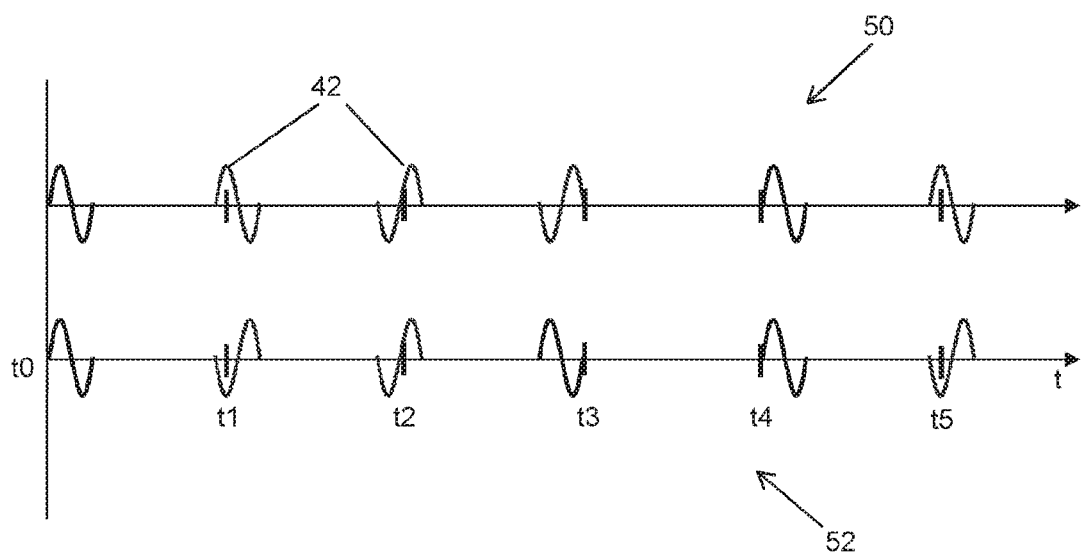
FIG. 6 is a graph showing a method according to a fourth embodiment of the disclosure for phase modulation of signals transmitted in the flow meter of FIG. 1.

An example of a pair of sequences that combines the techniques in this way is shown in FIG. 6, in which an upper sequence 50 of signals 42 represents signals transmitted by the first transducer 30, and a lower sequence 52 of signals 42 represents signals transmitted by the second transducer 32. As with FIG. 5, it should be noted that the signals 42 of the upper and lower sequences 50, 52 of FIG. 6 travel in opposite directions through the measurement channel 24.

In the sequences of FIG. 6, the initial angles of the signals 42 of each sequence 50, 52 change according to the same pattern used in the sequences 46, 48 of FIG. 5. Two further signal pairs are shown in FIG. 6 to include six pairs in total, the last two pairs being identical to the first two.

In addition, the timing of each signal 42 is varied in the same manner as in the FIG. 3 sequence 40 with respect to time markers t0 to t5, to achieve echo cancellation. It is noted that although the time interval between successive signals 42 from each individual transducer 30, 32 varies, each pair of signals 42 transmitted by the first and second transducers 30, 32 are transmitted simultaneously.

This demonstrates that the two complementary approaches for producing out-of-phase signals 42 are compatible for combination to achieve cancellation of both echoes and ringing-on of the transducers 30, 32 to ensure accurate flow rate measurements when operating at a high sample rate.

Figure 7:
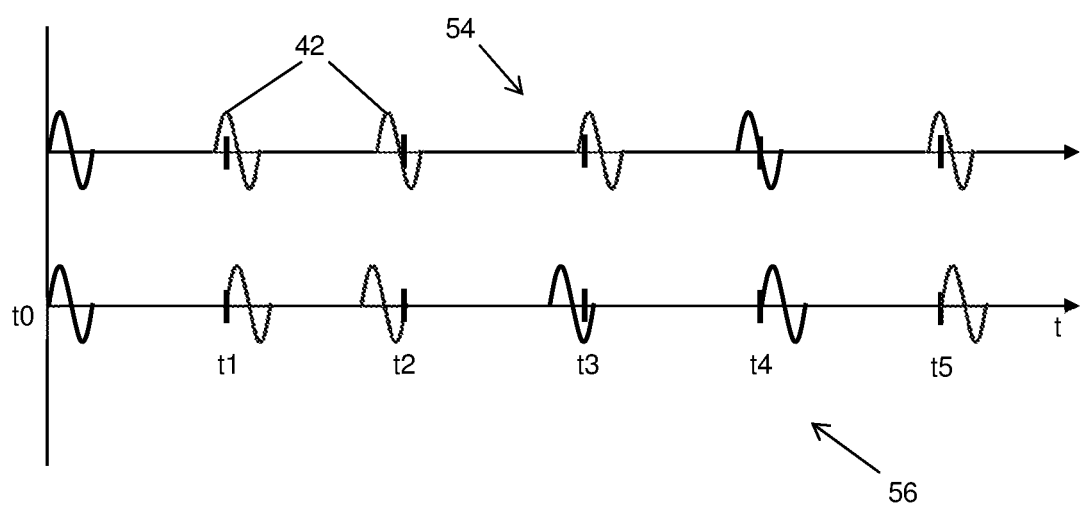
FIG. 7 is a graph showing a method according to a fifth embodiment of the disclosure for phase modulation of signals transmitted in the flow meter of FIG. 1.

Finally, FIG. 7 shows another pair of sequences, an upper sequence 54 from the first transducer 30, and a lower sequence 56 from the second transducer 32, which illustrates a further method for adjusting the relative phases of the measurement signals 42. In this approach near-simultaneous signals are used, in that each signal 42 of each pair of signals 42 is transmitted at a slightly different time to the other signal 42 of the pair, instead of transmitting both signals 42 of each pair simultaneously as in the above embodiments, with both signals being transmitted before either is received by its respective opposing transducer 30, 32. With appropriate control, the propagation times of each signal 42 can be measured independently with sufficient accuracy to provide reliable final values for the flow rate.

This approach is equivalent to varying the intervals between successive signals 42 as in FIG. 3, with the added feature that the series of signals 42 transmitted by each transducer 30, 32 has a different pattern of intervals. This increases the overall variation of the characteristics of the signals 42 within the measurement channel 24 over time, which enhances the effect of reducing the effect of echoes to zero mean noise.

Varying the timing of a measurement signal with respect to an opposing signal being transmitted near-simultaneously also means that interference due to ringing-on becomes random from one pair of measurement signals to the next. This enhances the tendency for ringing-on to produce zero-mean noise, rather than a systematic error. Thus, the technique shown in FIG. 7 helps to combat the effect of noise arising from both echoes and ringing-on.

It is noted that although the signals 42 shown in FIG. 7 all have the same initial angle, this technique can be combined with that of FIG. 4 by altering the initial angles of each signal 42 as desired.

While the signals 42 in FIG. 7 are not precisely simultaneous, as each pair overlaps the period allowed for echoes to decay remains higher than in prior art arrangements in which opposing signals are transmitted in sequence, thereby reducing the effect of echoes. In other embodiments, the opposing signals 42 may not overlap, with the phase modulation provided by varying the intervals between successive signals 42 being sufficient for echo cancellation.

Many of the above techniques share the feature of employing phase-modulation patterns that will produce substantially zero mean noise in the long-term. To generalise the approaches set out above, this noise cancellation is achieved by varying the phases of successive signals so that the average phase of the resulting sequence of signals substantially corresponds to the mid-point of the range over which the phases are varied.

To optimise noise cancellation, the signal phases should be varied so that they are distributed reasonably evenly over a working range of phase variation. For example, a sequence of signals may have substantially equal numbers of signals having respective phases in each quartile of the working range. In practical terms, this is most easily achieved either with repeating sequences with regular changes in phase, or with sequences having entirely randomised phases.

This general approach ensures that when a signal of interest, or 'wanted signal', is detected, any residual signals within the measurement channel 24 at the moment at which the wanted signal is received by a transducer 30, 32 sum towards zero. In turn, the vector sum of error contributions of those residual signals tends towards zero, thereby minimising the impact of the residual signals on the measurement of the wanted signal.

For example, if a wanted signal is transmitted at t=0 with a phase of 0° from one end of the path to the opposite end, that signal is received at the other end of the path at $t=T_p$, where $T_p$ represents the pure propagation delay through the fluid from the transmitting transducer 30, 32 to the receiving transducer 30, 32.

If $T_p$ corresponds to a whole number of cycles of the signal plus a residual period, the wanted signal at time $t=T_p$ has a value 'P', which may be considered as a vector quantity composed of an amplitude, and a phase—relative to the known initial phase of 0° in this example—which is the quantity of interest. It is desirable to measure value P as accurately as possible, because its phase indicates the residual time (i.e. $T_p$ minus an integer number of whole cycles), which is of most interest when determining an accurate flow rate.

After a series of wanted signals have been transmitted and measured in this manner, a set of values $P_0, P_1, P_2 \ldots P_n$ can be determined for integer values of n.

Considering each potential interfering signal separately, each measured value $P_n$ is subject to an error $E_n$ due to a respective source of interference. Consequently, in each measurement the detected phase '$M_n$' is equal to the sum of a wanted signal $P_n$ plus an error signal $E_n$.

In embodiments of the disclosure, the phase of the wanted signal is modified with respect to each potential interfering signal, such that over any given set of measurements the sum of the error terms $E_n$ tends towards zero regardless of their amplitude, so that:

$$\text{SUM}(M_n) = \text{SUM}(P_n) + 0,$$

Therefore, the mean measured value M tends towards the mean wanted value P.

There are a wide range of sequences that satisfy the above criteria and therefore achieve effective noise cancellation.

For example, in a completely randomised phase sequence having a phase range of 0° to 360°, the phases of the signals of the sequence are, on average, equally distributed to each side of 180°, and so the error contributions made by earlier signals sum towards zero over the course of the sequence. A randomised sequence may be particularly useful as it is likely to cancel all potential interfering sources equally well, since the phase of the wanted signal is not derived from or correlated with any one particular source of interference.

In another example, if a sequence causes the phases of the error terms to alternate between 0° and 180°, each $E_n = -E_{(n-1)}$, so the error cancels out over just two measurements. This is an effective approach if only one interfering signal needs to be cancelled, and results in a practical sequence that is four steps long.

Alternatively, a three-step sequence may be designed such that the phase of each signal changes by 120 degrees relative to the previous signal, so that the respective errors vary by 120° with each measurement. This causes the associated error to cancel over any consecutive group of three measurements. This approach has the advantage that a single interfering source can be cancelled using a sequence of just three steps and therefore allows a maximised signal bandwidth for a given measurement rate.

This principle extends to any set of N measurements, such that the phases of each individual $E_n$ are equal to $K*(360/N)$ for $0 <= K <= (N-1)$, in any order.

In another possible implementation, a sequence of signals transmitted by the two transducers and having an overall phase range of 360° may have their phases controlled such that, over time, at least one of the following statements holds true or substantially true:

the phase of any given signal is within 90° of the phase of the preceding signal (from the same transducer) as often as it is not; and the phase of any given signal is within 90° of the phase of the corresponding signal from the other transducer as often as it is not.

For a sequence having a different phase range, the above values are scaled accordingly.

It will be appreciated by a person skilled in the art that the disclosure could be modified to take many alternative forms to that described herein, without departing from the scope of the appended claims. For example, although transducers that are operable as either transmitters or receivers are used in the above described embodiments, in alternative embodiments separate, dedicated transmitters and receivers may be used.

The invention claimed is:

1. A method of measuring a flow rate of a fluid flowing along a path, the method comprising:
transmitting a sequence of pairs of periodic signals through the fluid, the respective pairs of signals being transmitted in succession, the respective signals of each pair being transmitted in opposite directions along, and from opposite ends of, the path, wherein successive signals transmitted in the same direction are separated by intervals;
determining a difference in propagation times of each signal of each pair along the path; and
determining a flow rate of fluid along the path based on the difference in propagation times of the signals of each pair along the path;
wherein a phase of each signal is altered with respect to a phase of at least one other signal of the sequence.

2. The method of claim 1, wherein the at least one other signal comprises a corresponding other signal of the respective pair of signals.

3. The method of claim 1, wherein the at least one other signal comprises a signal previously transmitted along the path.

4. The method of claim 1, wherein altering the phase of each signal comprises changing a time interval between each signal and a respective preceding signal transmitted from the same end of the path with respect to a time interval between the respective preceding signal and a signal that preceded the respective preceding signal.

5. The method of claim 1, wherein altering the phase of each signal comprises changing an initial angle of each signal relative to an initial angle of a respective preceding signal transmitted from the same position in the path.

6. The method of claim 1, wherein altering the phase of each signal comprises changing an initial angle of each signal relative to an initial angle of a corresponding other signal of the respective pair of signals.

7. The method of claim 6, comprising transmitting at least two successive signals from each end of the path with equal angles.

8. The method of claim 5, wherein changing the initial angle of a signal comprises inverting the signal with respect to the at least one other signal.

9. The method of claim 1, wherein altering the phase of each signal comprises changing a delay between transmitting a first signal of each pair and transmitting a second signal of each pair.

10. The method of claim 1, comprising transmitting the respective signals of each pair of periodic signals simultaneously.

11. The method of claim 1, comprising altering the respective phases of each signal of the sequence so that an average phase of the signals of the sequence is equal to a mid-point of a range over which the phases of the signals of the sequence are varied.

12. The method of claim 11, comprising altering the phases of the signals of the sequence so that the phases are evenly distributed throughout the range over which the phases of the signals of the sequence are varied.

13. The method of claim 1, wherein each signal is a pressure wave.

14. The method of claim 13, wherein each signal is an ultrasonic signal.

15. A controller for a flow meter, the controller being configured to:
generate activation signals that cause first and second transmitters of the flow meter to transmit a sequence of pairs of periodic measurement signals in succession to respective first and second receivers in opposite directions along, and from opposite ends of, a path along which fluid flows, successive signals transmitted in the same direction being separated by intervals, wherein each activation signal is arranged such that a phase of the resulting measurement signal is altered with respect to a phase of at least one other measurement signal of the sequence;
receive detection signals from the first and second receivers, each detection signal being indicative of arrival of a measurement signal at the respective receiver; and
process the detection signals to determine a difference in propagation times of each measurement signal along the path, and to determine a flow rate of fluid along the path based on the difference in propagation times of the measurement signals along the path.

16. A flow meter, comprising:
a measurement channel through which fluid flows along a path;
a first transmitter and a second transmitter that are spaced from each other within the measurement channel so as to transmit a sequence of pairs of periodic signals in succession through the fluid in opposite directions along, and from opposite ends of, the path, successive signals transmitted in the same direction being separated by intervals;
a first receiver positioned within the measurement channel to receive periodic signals transmitted by the first transmitter;
a second receiver positioned within the measurement channel to receive periodic signals transmitted by the second transmitter; and
a controller arranged to:
control the first and second transmitters to transmit respective measurement signals to their respective receivers through fluid flowing along the path, wherein a phase of each signal is altered with respect to a phase of at least one other signal transmitted along the path;
receive and process detection signals from the first and second receivers to determine a difference in propagation times of each signal of each pair along the path; and
determine a flow rate of fluid along the path based on the difference in propagation times of the signals of each pair along the path.

17. The flow meter of claim 16, comprising a first transducer and a second transducer, wherein the first transducer comprises the first transmitter and the second receiver, and the second transducer comprises the second transmitter and the first receiver.

18. The method of claim 1, comprising randomising the phases of the signals of the sequence.

\* \* \* \* \*